L. R. PAUL.
NUT LOCK.
APPLICATION FILED JULY 23, 1917.
1,271,935.
Patented July 9, 1918.
Fig. 1.
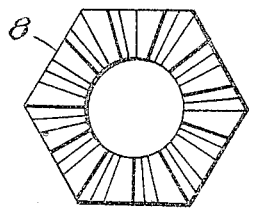
Fig. 2.
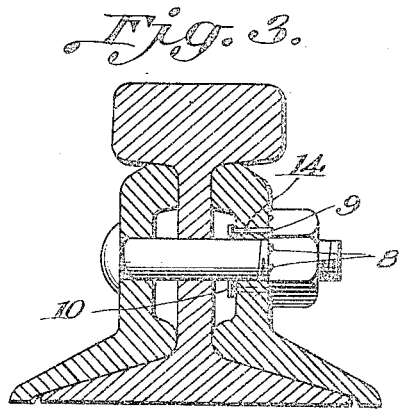
Fig. 3.
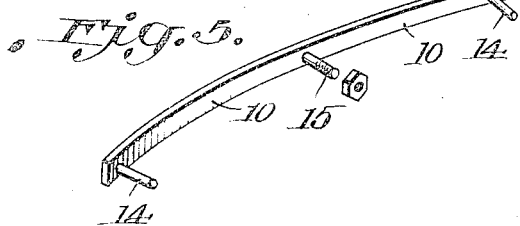
Fig. 5.
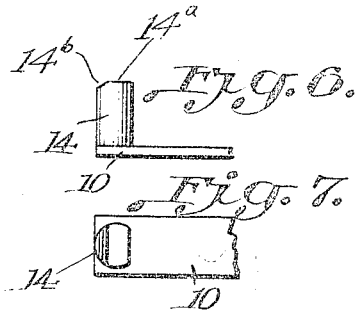
Fig. 6.
Fig. 7.
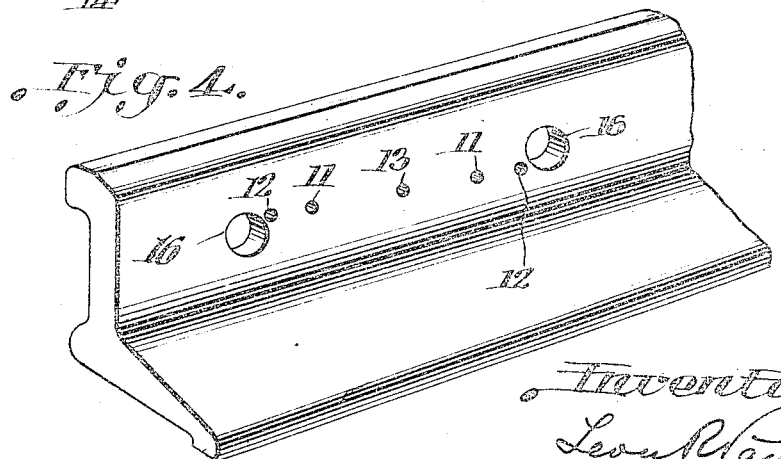
Fig. 4.
Inventor:
Leon R. Paul

UNITED STATES PATENT OFFICE.

LEON R. PAUL, OF HEREFORD, TEXAS.

NUT-LOCK.

1,271,935.  Specification of Letters Patent.  Patented July 9, 1918.

Application filed July 23, 1917. Serial No. 182,143.

*To all whom it may concern:*

Be it known that I, LEON R. PAUL, a citizen of the United States, residing at Hereford, in the county of Deaf Smith and State of Texas, have invented new and useful Improvements in Nut-Locks, of which the following is a specification.

My invention relates to a nut lock particularly for association with a fish plate and a plurality of nuts. I principally aim to provide a nut lock having a spring bar mounting locking pins at each end having blunt surfaces and inclined surfaces, with the inclinations so arranged that they may be provided by passing the article but once through a machine and may flatly engage locking grooves of the nut by mounting the bar on a fish plate diagonally.

With the above and servient objects, such as will appear hereinafter in view, the invention has been embodied in one preferred form as illustrated in accompanying drawings wherein:

Figure 1 is a side elevation of a nut conforming to my invention; Fig. 2 is a bottom view thereof; Fig. 3 is a vertical sectional view through a rail and fish plates showing my improvements associated therewith; Fig. 4 is a perspective view of a fragment of a fish plate used with my invention; Fig. 5 is a plan view of the locking bar; and Figs. 6 and 7, respectively are fragmentary side and top views of one end of the locking bar and the pins thereon.

Referring specifically to the drawings, I show by way of example, a rail in Fig. 3, having fish plates 17 on the opposite sides thereof as usual. The fastening bolts passing through these conventional parts are designated 6 and their bolts are numbered 7. My improvements coöperate with a pair of nuts. To this end I provide an opening 13 and openings 11 and 12 through one of the fish plates and a locking bar 10 with a bolt 15 and locking pins 14. This locking bar is normally curved as shown in Fig. 5 and is of spring metal. In use it is disposed in the space between the web of the rail and the fish plate which mounts it as seen in Fig. 3. Pins 14 extend through and beyond the openings 12 while the bolt 15 passes through the opening 13, receiving its nut beyond the opening. The nut is normally tightened so as to tension bar 10. The fish plate is not materially weakened by the provision of the openings.

The pins 14 have flat or blunt ends 14ᵃ as shown and inclined walls 14ᵇ. These walls coöperate with inclined walls 8ᵃ of undercut grooves of the nut 8.

In use, the nuts are held against loosening by the engagement of the pins 14 with the grooves of the nuts. Said nuts, however may be freely turned in the opposite direction until they are tight. As the nut turns the inclined walls 8ᵃ push the pins inward against the tension of the spring bar 10. In order to loosen the nuts, pins or suitable instruments may be inserted through the opening 11 to pry the bar and pins out of engagement with the nuts temporarily.

By reason of the blunt and flat walls 14ᵃ and 14ᵇ, I avoid pins which have sharp walls or points and which do not wear well and prove practical in use.

A very important feature of the present is the diagonal or angular disposition of the bar 10. Due to the pins 14 having the walls 14ᵇ extending in the same general direction, such walls may be provided by passing the bar 10 with the pins 14 thereon but once through a suitable grinding machine. This is an important point when the ease and cost of manufacture are taken into consideration, and especially when the bar and pins are made in one piece. Then when the bar is positioned it should be angularly disposed so as to have the walls 14ᵇ flatly engage the walls of the grooves of the nut.

It will be noticed that the grooves of the nut have the walls 8ᵃ inwardly inclined and between two radial lines.

Changes such as fall within the spirit and scope of the invention are reserved.

I claim:—

1. A nut lock, in combination with a fish plate, comprising a resilient bar disposed against the inner surface of the plate and having pins extending therethrough toward the outer surface, fastening bolts extending through the fish plate, nuts on said bolts having grooves in their inner surfaces, each groove having radial side lines and an inclined wall extending from one of the lines to the other line, said pins having inclined walls, and said bar being disposed at an angle whereby said inclined walls of the pins will spring flat against the inclined walls in the grooves.

2. A nut lock, in combination with a fish plate, comprising a resilient bar disposed against the inner surface of the plate and having pins extending therethrough toward the outer surface, fastening bolts extending through the fish plates, one of the fish plates having openings spaced from the bolt openings and through which the pins pass, said pins having blunt ends and inclined walls extending therefrom in substantially the same lateral direction so that they may be ground simultaneously by one passage of the bar with the pins thereon through a grinding machine, nuts on said bolts having grooves in their inner surfaces, each groove having radial side lines and an inclined wall extending from one of the lines to the other line, and said bar being disposed at an angle whereby said inclined walls thereof will spring flat against the inclined walls in the grooves.

May 21st, 1917.

LEON R. PAUL.

Witnesses:
F. J. BEGRIN,
J. FRANK POTTS.